Figure 1:
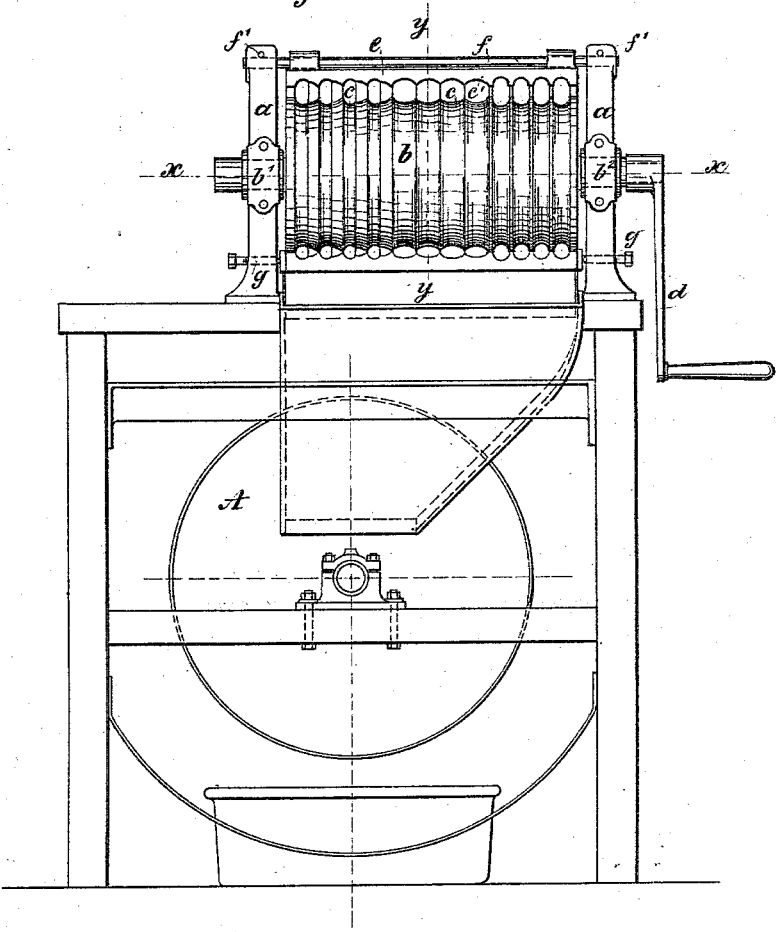

(No Model.) 2 Sheets—Sheet 1.

W. KILIAN.
MACHINE FOR SHAPING PLASTIC MATERIAL.

No. 296,183. Patented Apr. 1, 1884.

Witnesses.
Chas. J. Hyer.
Robert Everett.

Inventor.
Wilhelm Kilian
By James L. Norris,
Atty.

(No Model.) 2 Sheets—Sheet 2.
W. KILIAN.
MACHINE FOR SHAPING PLASTIC MATERIAL.
No. 296,183. Patented Apr. 1, 1884.
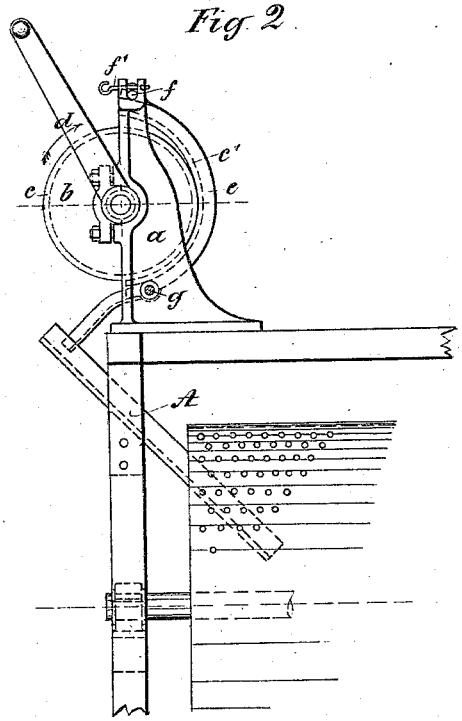
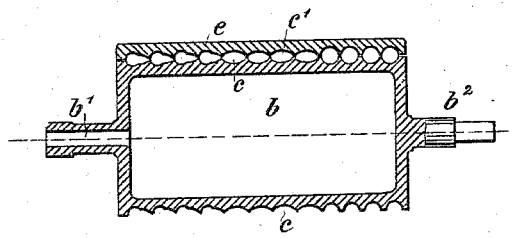
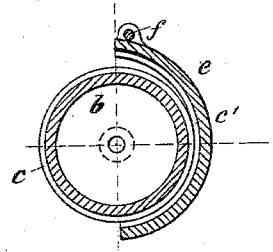

UNITED STATES PATENT OFFICE.

WILHELM KILIAN, OF BERLIN, ASSIGNOR TO GEBR STOLLWERCK, OF COLOGNE-ON-THE-RHINE, GERMANY.

MACHINE FOR SHAPING PLASTIC MATERIALS.

SPECIFICATION forming part of Letters Patent No. 296,183, dated April 1, 1884.

Application filed February 13, 1884. (No model.) Patented in Germany April 9, 1880, No. 12,165.

*To all whom it may concern:*

Be it known that I, WILHELM KILIAN, of the city of Berlin, in the Kingdom of Prussia, and German Empire, have invented certain new and useful Improvements in Machines for Shaping Plastic Materials, of which the following is a specification, reference being had to the accompanying drawings, and to the letters of reference marked thereon.

This invention relates to machines for shaping plastic materials; and its object is to provide a novel construction of such machines for shaping sweetmeats—such as drops, bonbons, candy plums, and the like—pills for medicinal use, and similar plastic matter; and the said invention consists in the construction of machines of the said kind, with a suitably fluted or grooved forming-cylinder, in combination with a correspondingly fluted or grooved segment, adapted to receive a cylindrical bar of plastic material between them, to cut the said bar into pieces of the required size or sizes, and to form the said pieces into the desired shape in one operation.

To enable others skilled in the art to better understand the nature of my invention, I will now proceed to describe the same, reference being had to the accompanying drawings, in which—

Figure 1 is a front view of my improved machine for shaping plastic material, showing the outlines of the combined forming-cylinder and segment in different forms and sizes, said cylinder and segment being ajar at their upper and brought together at their lower ends. Fig. 2 is an end view of the said machine. Fig. 3 is a longitudinal horizontal section on the line $x\,x$, Fig. 1, and shows the edges of the corresponding grooves in the forming cylinder and segment brought together, so as to form tubular passages whose sectional areas as to shape and size correspond with the respective shape and size of the said grooves brought together; and Fig. 4 is a vertical transverse section on the line $y\,y$, Fig. 1.

$b$ is the forming-cylinder, preferably made hollow, and provided with pivots $b'\,b^2$, which are suitably journaled in the standards $a$, the latter in the drawings being shown as arranged upon a frame, A. The cylinder $b$ is provided with grooves $c$, of semicircular, semi-oval, or any other desired sectional semi-form, and preferably roughened or ribbed, and its pivot $b^2$ is provided with a crank and handle, $d$, to allow of transmitting rotatory motion to the cylinder $b$. The opposite pivot, $b'$, is made hollow, so as to permit of admitting steam, hot sand, or other suitable substance adapted to heat the cylinder $b$ from within, if required.

$e$ is the forming-segment, which is made eccentric, so as to fit nicely upon the cylinder $b$ with the lower part of its inner surface, and to diverge from the said cylinder near and at its upper end. The segment $e$, upon its surface adjacent to the cylinder $b$, is provided with semi-formed grooves $c'$, corresponding as to size and shape with the grooves upon the outer surface of the said cylinder.

$f$ is a bar fastened to the upper end of the segment $e$, and by means of the pins $f'$ held in bearings provided in the upper ends of the standards $a$. The segment, near its lower end, is provided with lateral depressions for the reception of the pointed ends of the binding-screws $g$, passing through the standards $a$, and serving to rigidly hold the segment in position upon the cylinder $b$. Thus it will be seen that when the segment $e$ is properly placed upon the cylinder $b$, in the manner described, there will be a free space near its upper end, between its inner surface and the outer surface of the said cylinder, but that the two surfaces will approach each other gradually until the edges adjacent to their respective grooves $c$ and $c'$ will meet, when the said grooves will form tubular passages, which will continue downward to the lower end of the segment.

Having thus described the construction of my improved machine for shaping plastic materials, I will now proceed to describe its operation.

Rotary motion in the direction indicated by the arrow, Fig. 2, is imparted to the cylinder $b$ by means of the crank and handle $d$, while the segment $e$ remains stationary, and then a cylindrical bar of sweetmeat or other desired plastic material, and of proper diameter and length, is dropped into the open space between the upper end of the segment and cylinder, so that the axis of the latter and the axial line of the said bar will be substantially parallel. The rotating cylinder will at once catch hold of the bar, which will be pressed into the grooves $c\ c'$, and cut into pieces by the edges between the latter, the said pieces conforming themselves to the shape of the tubular passages formed by the grooves, as described. On their way through the said tubular passages the pieces will be turned constantly around their own axes, and will come out perfectly formed at the lower end of the segment $e$, whence, by means of a suitable hopper, they may be dropped into a rotating drum having perforated walls, so as to admit air for the purpose of cooling the finished material, if required.

I wish it to be distinctly understood that I do not confine myself to the means shown for holding the segment in position upon the cylinder, nor to the means for transmitting rotary motion to the latter, as it will be readily understood that such means can be modified in various respects without deviating from the nature of my invention.

Having thus described my invention, what I claim as new, and desire to secure by Letters Patent, is—

In a machine for shaping plastic material, the combination, with the rotating cylinder $b$, having the grooves $c$, of the segment $e$, arranged as described, and having the grooves $c'$, corresponding with the grooves $c$, and forming therewith tubular passages when the said grooves are brought together, substantially as and for the purpose set forth.

In testimony whereof I have signed my name to this specification in the presence of two subscribing witnesses.

WILHELM KILIAN.

Witnesses:
B. ROI,
ROBERT R. SCHMIDT.